United States Patent
Granz et al.

(10) Patent No.: US 10,510,373 B1
(45) Date of Patent: Dec. 17, 2019

(54) MULTIPLE-ACTUATOR DRIVE WITH SEPARATE, RADIALLY-DEFINED, ZONES HAVING REDUCED SKEW AND/OR DIFFERENT TRACK PROPERTIES

(71) Applicant: Seagate Technology LLC, Cupertino, CA (US)

(72) Inventors: Steven Douglas Granz, Shakopee, MN (US); Mehmet Fatih Erden, St. Louis Park, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 15/939,502

(22) Filed: Mar. 29, 2018

(51) Int. Cl.
*G11B 5/48* (2006.01)
*G11B 20/12* (2006.01)

(52) U.S. Cl.
CPC ........ *G11B 20/1217* (2013.01); *G11B 5/4886* (2013.01); *G11B 20/1258* (2013.01); *G11B 2020/1238* (2013.01); *G11B 2020/1292* (2013.01)

(58) Field of Classification Search
None
See application file for complete search history.

(56) References Cited

U.S. PATENT DOCUMENTS

| | | |
|---|---|---|
| 4,577,240 A | 3/1986 | Hedberg et al. |
| 4,751,596 A | 6/1988 | Rohart |
| 4,823,196 A | 4/1989 | Goddard |
| 4,972,396 A | 11/1990 | Rafner |
| 5,081,552 A | 1/1992 | Glaser et al. |
| 5,202,799 A * | 4/1993 | Hetzler ............... G06F 3/0601 360/48 |
| 5,223,993 A * | 6/1993 | Squires ............... G06F 3/0601 360/246.7 |
| 5,293,282 A | 3/1994 | Squires et al. |
| 5,343,347 A * | 8/1994 | Gilovich ............. G11B 5/4813 360/246.7 |
| 5,355,486 A * | 10/1994 | Cornaby ............. G11B 19/02 360/77.08 |
| 5,523,901 A | 6/1996 | Anderson et al. |

(Continued)

FOREIGN PATENT DOCUMENTS

| | | | |
|---|---|---|---|
| JP | 10208411 A | * | 8/1998 |
| JP | 410208411 | | 8/1998 |

OTHER PUBLICATIONS

Okada, Shunji, "Magnetic Disk Apparatus and Writing Method of Servo Pattern of the Like," Published Aug. 7, 1998, JP 10208411A Translation Document (Year: 1998).*

(Continued)

*Primary Examiner* — William J Klimowicz
(74) *Attorney, Agent, or Firm* — Mueting, Raasch & Gebhardt, P.A.

(57) ABSTRACT

First tracks are read via a first head that is moved via a first actuator over a first, radially-defined, zone of a disk surface. Second tracks are read via a second head that is moved via a second actuator over a second zone of the disk surface that is separate from the first zone. The first and second heads are optimized to read data within first and second skew angle ranges associated with the first and second zones. The first and second skew angle ranges are each less than a total skew angle range of the disk surface.

20 Claims, 5 Drawing Sheets

(56) References Cited

U.S. PATENT DOCUMENTS

| | | | |
|---|---|---|---|
| 6,021,024 A | 2/2000 | Akiyama et al. | |
| 6,057,990 A | 5/2000 | Gilovich | |
| 6,081,399 A | 6/2000 | Lee et al. | |
| 6,317,282 B1 | 11/2001 | Nam | |
| 6,483,654 B2 | 11/2002 | Nam | |
| 6,502,178 B1 | 12/2002 | Olbrich | |
| 6,658,201 B1 | 12/2003 | Rebalski | |
| 6,690,549 B1 | 2/2004 | Aikawa et al. | |
| 6,735,032 B2 | 5/2004 | Dunn et al. | |
| 6,883,062 B2 | 4/2005 | Susnjar | |
| 7,102,842 B1 * | 9/2006 | Howard | G11B 5/5521 360/61 |
| 7,123,435 B1 * | 10/2006 | Schreck | G11B 5/59655 360/78.08 |
| 7,146,623 B2 | 12/2006 | Kuwajima et al. | |
| 7,193,807 B1 | 3/2007 | Liikanen et al. | |
| 7,199,981 B2 * | 4/2007 | Zabtcioglu | G11B 5/012 360/266.2 |
| 7,315,429 B2 | 1/2008 | van Zyl | |
| 7,379,257 B2 | 5/2008 | Yamagishi | |
| 7,385,781 B1 * | 6/2008 | Craig | G06F 3/0676 360/77.01 |
| 7,430,091 B2 * | 9/2008 | Manasse | G11B 5/5578 360/75 |
| 7,679,851 B1 | 3/2010 | Sun et al. | |
| 7,710,683 B2 | 5/2010 | Craig et al. | |
| 8,223,451 B2 | 7/2012 | Breslau et al. | |
| 8,351,147 B2 | 1/2013 | Breslau et al. | |
| 8,699,175 B1 * | 4/2014 | Olds | G11B 20/1217 360/78.14 |
| 8,953,276 B1 * | 2/2015 | Pokharel | G11B 5/596 360/75 |
| 9,099,103 B1 | 8/2015 | Krichevsky | |
| 9,418,688 B1 | 8/2016 | Rausch et al. | |
| 9,472,223 B1 | 10/2016 | Mendonsa et al. | |
| 9,508,362 B2 | 11/2016 | Gao et al. | |
| 9,508,370 B1 * | 11/2016 | Zhu | G11B 5/59627 |
| 9,570,104 B1 * | 2/2017 | Erden | G11B 20/10009 |
| 9,633,675 B2 | 4/2017 | Zhu et al. | |
| 9,666,213 B1 | 5/2017 | Erden et al. | |
| 9,830,939 B1 * | 11/2017 | Hamilton | G11B 5/5578 |
| 9,830,944 B1 | 11/2017 | Mendonsa et al. | |
| 9,911,442 B1 * | 3/2018 | Kharisov | G11B 5/5547 |
| 10,002,625 B1 | 6/2018 | Erden | |
| 10,037,779 B1 * | 7/2018 | Mendonsa | G11B 21/08 |
| 10,043,543 B1 * | 8/2018 | Buch | G11B 5/59627 |
| 10,068,597 B1 | 9/2018 | Jury et al. | |
| 2004/0179465 A1 * | 9/2004 | Kuwajima | G11B 5/5521 369/300 |
| 2007/0297083 A1 * | 12/2007 | van Zyl | G11B 5/4806 360/69 |
| 2008/0123213 A1 | 5/2008 | Craig et al. | |
| 2008/0239554 A1 | 10/2008 | Takeda et al. | |
| 2012/0250177 A1 * | 10/2012 | Somanache | G11B 5/4813 360/55 |
| 2016/0147650 A1 | 5/2016 | Gao et al. | |
| 2016/0148630 A1 | 5/2016 | Rausch | |
| 2016/0148636 A1 | 5/2016 | Ma et al. | |
| 2016/0148637 A1 | 5/2016 | Rausch et al. | |
| 2016/0148641 A1 | 5/2016 | Gao et al. | |
| 2017/0168908 A1 | 6/2017 | Kbali et al. | |
| 2017/0309304 A1 * | 10/2017 | Tan | G11B 5/5578 |
| 2017/0330587 A1 | 11/2017 | Gao et al. | |
| 2018/0174613 A1 * | 6/2018 | Zhu | G11B 5/012 |

OTHER PUBLICATIONS

U.S. Appl. No. 15/381,016, Zhu et al., filed Dec. 15, 2016.
U.S. Appl. No. 15/939,493, Granz et al., filed Mar. 29, 2018.
Apr. 18, 2018, File History for U.S. Appl. No. 15/381,016 as retrieved from the U.S. Patent and Trademark Office.
File History for U.S. Appl. No. 15/381,016 as retrieved from the U.S. Patent and Trademark Office.
File History for U.S. Appl. No. 15/939,493 as retrieved from the U.S. Patent and Trademark Office.

* cited by examiner

MULTIPLE-ACTUATOR DRIVE WITH SEPARATE, RADIALLY-DEFINED, ZONES HAVING REDUCED SKEW AND/OR DIFFERENT TRACK PROPERTIES

SUMMARY

The present disclosure is directed to a multiple-actuator drive with separate, radially-defined, zones having reduced skew and/or different track properties. In one embodiment, first tracks are read via a first head that is moved via a first actuator over a first, radially-defined, zone of a disk surface. Second tracks are read via a second head that is moved via a second actuator over a second zone of the disk surface that is separate from the first zone. The first and second heads are optimized to read data within first and second skew angle ranges associated with the first and second zones. The first and second skew angle ranges are each less than a total skew angle range of the disk surface.

In another embodiment, separated tracks are written to a first, radially-defined, zone of a disk surface of a drive via a first head that is moved via a first actuator over the first zone. Partially overlapping tracks are written to a second, radially-defined, zone of the disk surface that is separate from the first zone via a second head that is moved via a second actuator over the second zone. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
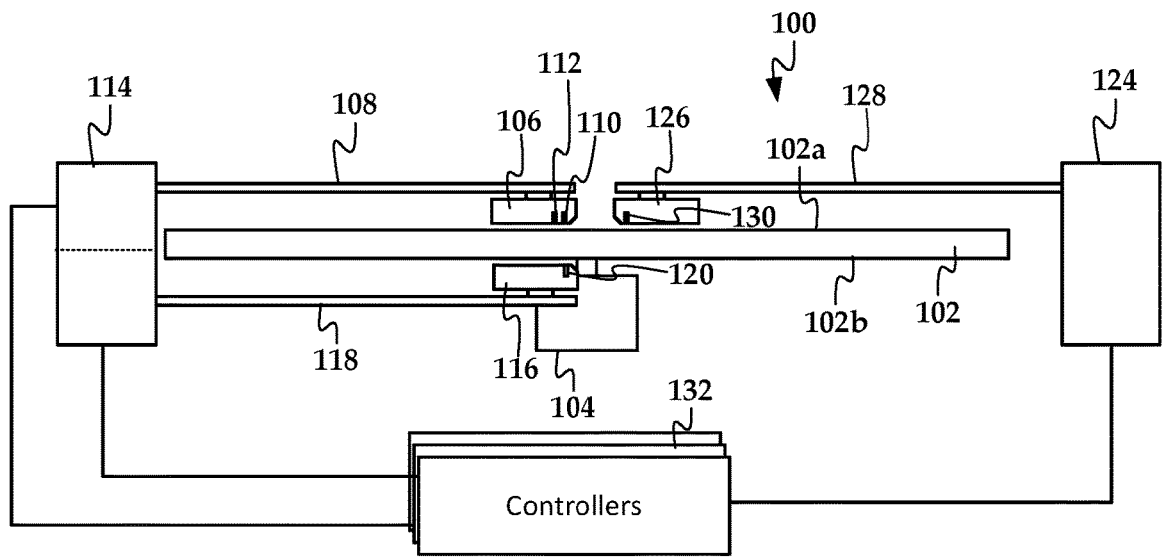
FIG. 1 is a diagram of an apparatus according to an example embodiment.

The present disclosure generally relates to data storage devices that utilize magnetic storage media, e.g., hard disk drives (HDDs). Additional HDD features described herein (generally described as "parallelism" architectures) are seen as a way to increase HDD performance measures such as data throughput and latency. Generally, parallelism architectures operate multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for multiple simultaneous random data access requests.

In embodiments described below, a hard disk drive includes multiple heads driven by different actuators that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. In either case, the head and actuators themselves are operating independently, although in coordination in the latter case. The parallelism architectures may be extended to other components that operate in the HDD, including system controllers, servo controllers, read/write channels, host interfaces, caches, etc.

While parallelism is generally considered a technique to increase data throughput, as described below it may also be used to increase areal density. For example, a conventional read/write head typically operates across the entire readable surface of the disk, from the inner diameter (ID) to the outer diameter (OD). Because the heads are on rotating arms, the heads will be oriented at significant skew angles to tracks near the ID and the OD. In order to mitigate the effects of skew, the track layouts and heads include margins (e.g., decreased track density, wider readers) to account for this. The high skew angles can also complicate tracking during writing as the cross track offset between the reader and writer relative to the track centerline changes with skew angle.

Skew can also be a complicating factor in certain data reading scenarios. For example, a technology known as two-dimensional magnetic recording (TDMR) uses two readers co-located on the same head or same head-gimbal assembly to simultaneously read data. One type of TDMR arrangement is known as multiple signal/sensor magnetic recording (MSMR) uses two or more readers to read from a single track at the same time. Another type of TDMR arrangement is TDMR multi-track (TDMR-MT), where multiple readers are used to read from more than one track at the same time. These technologies can be combined, e.g., using three readers to simultaneously read from two tracks.

The performance of various types of TDMR systems may rely on the location of two or more read transducers relative to one or more tracks. High angles of skew can affect this performance, as the readers may not be optimally aligned over the tracks at the high skew angles. It some cases, this may be addressed by spacing tracks differently at different skew angles, resulting in the track density (and other parameters) being suboptimum at some radial locations of the disk, Therefore, a system that reduces maximum skew has the potential to increase areal density for at least some types of TDMR.

In embodiments described below, a drive can utilize a multiple-actuator arrangement that facilitates reading and writing to regions that have reduced skew ranges. For example, one head and actuator may be configured to read from only one region between a middle diameter (MD) and the OD, and another head/actuator combination reads from only a second region between the MD and the ID. The heads may have multiple readers using some form of TDMR reading and signal processing. The writers of the head/ actuator combinations may also be used in the same ranges as the readers, or may be used across any of the ranges.

In FIG. 1, a diagram illustrates an apparatus 100 (e.g., data storage drive) with parallelism features according to example embodiments. The apparatus 100 includes at least one magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk 102. The slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The slider 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third slider 126 supported by a third arm 128. The third slider 126 (and its associated actuation hardware) may be included instead of or in addition to the second slider 116 and its associated actuation hardware). The third slider 126 is held over the first surface 102a of the disk 102 as a second actuator 124 causes the third arm 118 to move to different tracks on the disk 102. The arm 128 and actuator 124 move independently of arm 108 and actuator 114. The slider 126 includes read and/or write transducers 130. The transducers 130 are capable of reading from and/or writing to disk surface 102a simultaneously with transducers 110, 112 of first slider 106.

In the examples shown in FIG. 1, more than one disk 102 may be used, and the actuators 114, 124 may be coupled to additional arms and heads that simultaneously access some or all of the additional disk surfaces. In this context, "accessing" generally refers to electrically activating a read or write transducer and coupling the transducer to a read/write channel to facilitate reading from and writing to the disk. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time.

One or more controllers 132 are coupled to the respective actuators 114, 124 and control movement of the actuators 114, 124. The controllers 132 may include systems on a chip that perform such operations as servo control, encoding and decoding of data written to and read from the disk 102, queuing and formatting host commands, etc. If more than one controller 132 is used, the multiple controllers 132 may have the ability to execute multiple media read/write operations concurrently.

Figure 2:
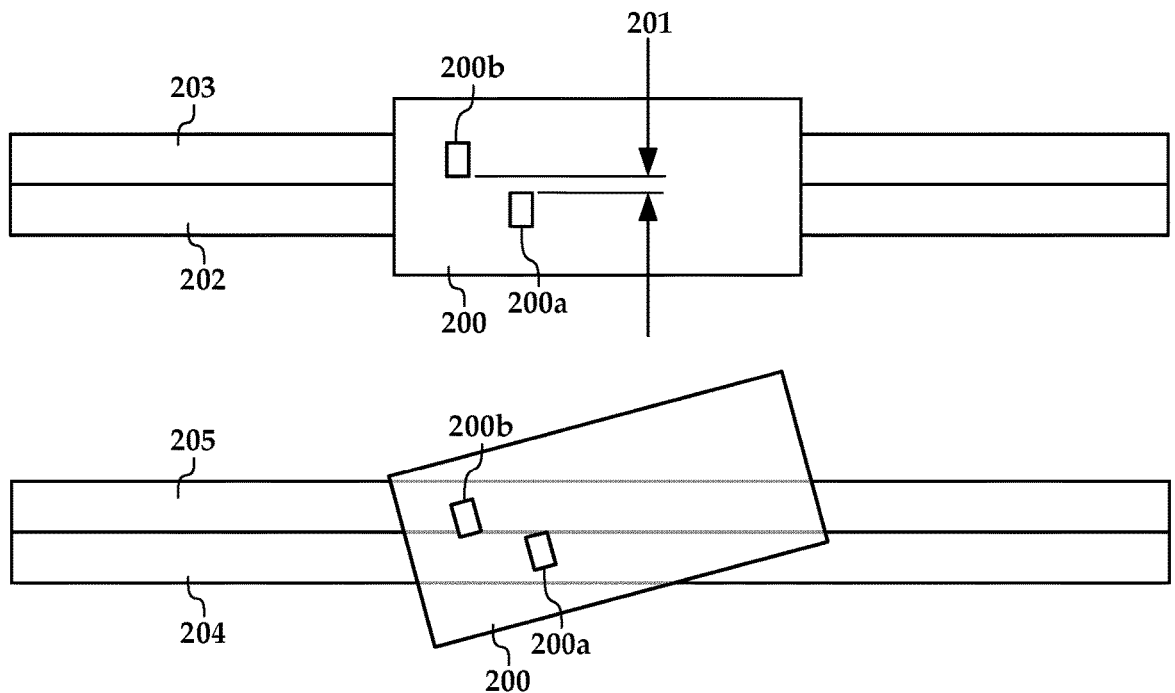
FIG. 2 is a diagram showing effects of skew angle on a reader according to an example embodiment.

As noted above, the apparatus 100 in FIG. 1 is configured to read different radially-defined regions (e.g., cylinders) via two different heads 106, 126 that access the same surface 102a. By limiting the heads 106, 126 to track within these different regions, the skew angle range of the heads 106, 126 can be reduced. A reduced skew angle range can allow using TDMR technology at higher areal density than would be achievable at the full skew angle range of the disk 102. In FIG. 2, a block diagram illustrates how skew angle can affect a TDMR head according to an example embodiment. At the top of the figure, a head 200 is shown with two readers 200a-b in a TDMR-MT arrangement, where reader 200b is configured to read track 203 at the same time reader 200a is configured to read track 200a. The readers 200a-b are centered over the tracks 202, 203, and a crosstrack gap 201 between the heads 200a-b reduces the amount of crosstrack interference between the tracks 202, 203.

At the top of the figure, the head 200 is at a zero skew angle relative to the tracks 202, 203. At the bottom of the figure, the same head 200 is shown at a non-zero skew angle (about 15 degrees) over two different tracks 204, 205, which are at a different radial location on the disk surface than tracks 202, 203. Note that this angle results in the readers 200a-b being located near the edge of the tracks 204, 205, which can increase crosstrack interference. One way to alleviate this is to increase distance 201 between the readers 200a-b. However, increasing the crosstrack distance 201 would also result in increasing the distance (pitch) between respective tracks 202-205, which reduces areal density.

Figure 3:
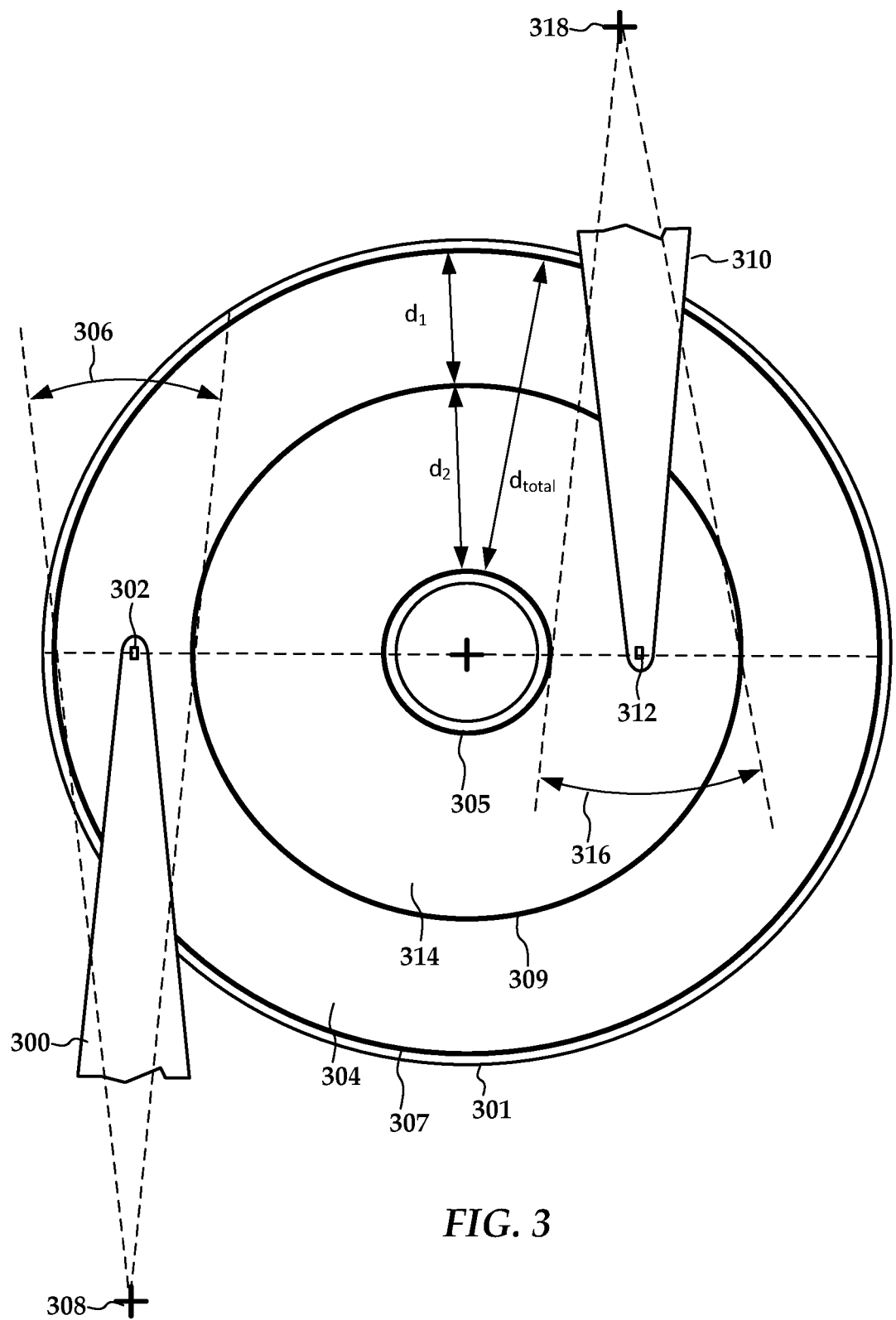
FIG. 3 is a diagram showing first and second heads writing to different radially-defined zones according to an example embodiment.

In FIG. 3, a diagram illustrates an example of skew reduction in a multi-actuator drive according to an example embodiment. In this example, arms 300, 310 are driven by different actuators (not shown) and move first and second heads 302, 312 across one surface of a disk 301. Head 302 is configured to read tracks in a first zone 304 of the disk which results in the head 302 being moved through skew angle range 306. Head 312 is configured to read tracks in a second zone 314 of the disk which results in the head 312 being moved through skew angle range 316. Each skew angle range 306, 316 is less than a full skew range of the disk between ID 305 and OD 307, which in this example is the sum of angles 306, 316. The MD 309 is used as a delimiter between the first and second zones 304, 314, and need not lie exactly in the middle (e.g., halfway) between the ID 305 and OD 307.

The definition of the MD 309 may be arbitrary, e.g., within some range that does not adversely affect the readers of heads 302, 312 at the skew limits. For example, $d_{total}$ shown in the figure is the total radial distance available for writing data, and $d_1$ and $d_z$ are respectively the radial distances allocated to the first and second zones 304, 314, where $d_{total}=d_1+d_2$. If $d_1=a_{MD}d_{total}$, and $d_2=(1-a_{MD})*d_{total}$, then $a_{MD}$ may be defined within some acceptable range, e.g., $0.4 \le a_{MD} \le 0.6$. In some cases the skew range may be equal for both zones 304, 314, such that $a_{MD} \approx 0.5$. In other cases, the areas of the zones 304, 314 (which roughly correspond to the amount of data stored in each zone) may be made equal. The setting of $a_{MD}$ (or some other similar parameter) may be made by the user during drive partitioning or via some other initial configuration.

As noted above, the writers of the head 302 may write only in zones 304 and writer of head 312 may only write in zone 314. Because both readers and writers are zone-specific in such a case, the axes 308, 318 of the actuators may be located such that the arms 300, 310 are at a right angle to a center location within the respective zone 304, 314. Alternatively, if the writers of one or both of the heads 302, 312 can write to both zones, then the axes 308, 318 of the actuators may be located such that the arms 300, 310 are at a right angle to a center location of the disk, e.g., near MD where $a_m p=0.5$. In such a case, the heads 302, 312 or the readers within the heads 302, 312 may be slightly rotated relative to the arms 300, 310 to minimize skew of the readers within the zones 304, 314 to which the heads 302, 312 are dedicated.

Note that the heads 302, 312 may each have multiple read transducers, e.g., magnetoresistive stacks. In one embodiment, the multiple read transducers on each head 302, 312 may be configured for TDMR reading within the associated zone 304, 314. In other configurations, one head/zone uses TDMR reading and the other used conventional track reading, with the heads, track layout, etc., being optimized appropriately. In either case, one of the zones 304, 314 may be optimized for performance and another of the zones may be optimized for capacity. These differences in performances can be used by the drive firmware or by the host. For example, the zones could be treated as tiered storage, with 'cold' data being stored in the high-capacity zone(s) and 'hot' data being stored in high-performance zone(s). In other embodiments, at least one read transducer within at least one head 302, 312 may be operable to read from more than one zone, to include the entire disk.

Note that, while reducing skew angle range may allow for improved read performance, the reduction in skew angle range can also benefit the write process. For example, reducing misalignment between the write pole and the track at the skew limits can reduce adjacent track interference for tracks that are tightly spaced together.

Figure 4:
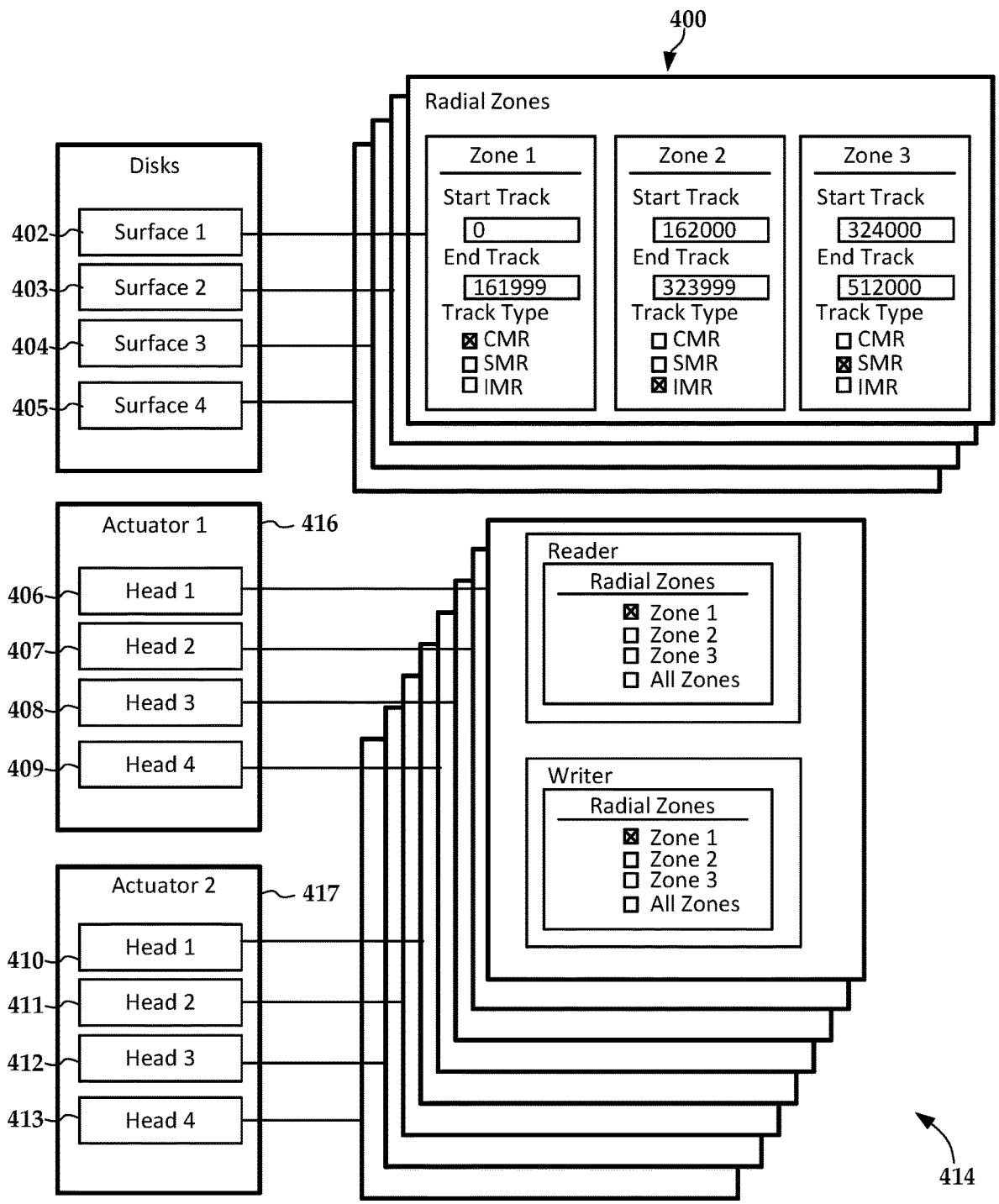
FIG. 4 is a diagram showing a user configuration of a drive according to an example embodiment.

The embodiments above may have some or all aspects of the radially-defined zones set at the factory. In other embodiments, the end user may be able to configure a number of different characteristics of the radially-defined zones. In FIG. 4, a block diagram illustrates an example of end-user configuration operations for a drive according to an example embodiment. In this example, separate disk configurations 400 are provided for each surface 402-405 of the disks (two disks in this case). The configurations 400 allow defining a plurality of zones (three zones in this example) on the basis of starting and ending tracks and track type.

In addition to writing separated tracks, which is associated with conventional magnetic recording (CMR), an apparatus according to various embodiments may be able to write overlapped tracks such as interlaced magnetic recording (IMR) and/or shingled magnetic recording tracks (SMR). Both of these reduce track widths by recording a first track (e.g., using a relatively strong magnetic field which results in a wider than normal track width) and then recording a second track partially overlapping the first track, thereby reducing the width of the first track. An SMR drive records a series of tracks each overlapping the next, with the last track in the series being written at the wider than normal width and not being overlapped. An IMR drive records wider tracks at about a 2× track pitch, and then writes narrower tracks between the wider tracks, the narrow tracks overlapping one or both adjacent wider tracks in which they are interlaced.

The use of IMR and SMR may impact performance due to complications in performing updates on overlapped tracks, however can increase areal density. Therefore, in this example configuration 400, the first zone is configured for relatively high performance using separated CMR tracks, and the second and third zones are configured for relatively high areal density using overlapping IMR and SMR tracks. Other track parameters may also be set in the configurations, such as read mode (e.g., MSMR, TDMR-MT) and track parameters (e.g., track pitch, bit aspect ratio). Note that although one disk configuration 400 is shown for each surface 402-405, the configuration may be cylinder-specific (the cylinder comprising a corresponding radial zone on all disk surfaces), in which case only one disk configuration 400 would be used for all surfaces 402-405, and the start and end tracks in configuration 400 would instead be start and end cylinders.

Once the zones have been defined in the disk configurations 400, the heads 406-413 that are respectively assigned to actuators 416, 417 can be set via head configurations 414. In this example, the head configurations 414 assign a particular head 406-413 to a particular one of the zones described in the disk configuration 400. The readers and writers of the heads may be assigned separately, e.g., in cases where writers can tolerate higher skew angles and therefore be assigned to additional zones. If the zones set in configuration 400 are assigned to cylinders instead of individual surfaces, then all of the heads in a particular actuator 416, 417 may use the same configuration 414.

The drive firmware may enforce some restrictions on the configurations 400, 414 to prevent errors, loss of recording area, etc. For example, if one or all heads 406-409 of actuator 416 are assigned to zone 1 as shown, then by default corresponding heads 410-413 of actuator 417 may be automatically assigned to both zones 2 and 3 to ensure those zones are made available for data storage. Also, assuming the readers and/or writers of heads 406-413 are optimized for respective skew angle ranges less than the total skew angle range of the disk, the track/cylinder ranges of the zone definitions 400 may have some limits so that the heads 406-413 do not operate in a skew angle range that could significantly degrade performance, e.g., such that data might be lost.

Figure 5:
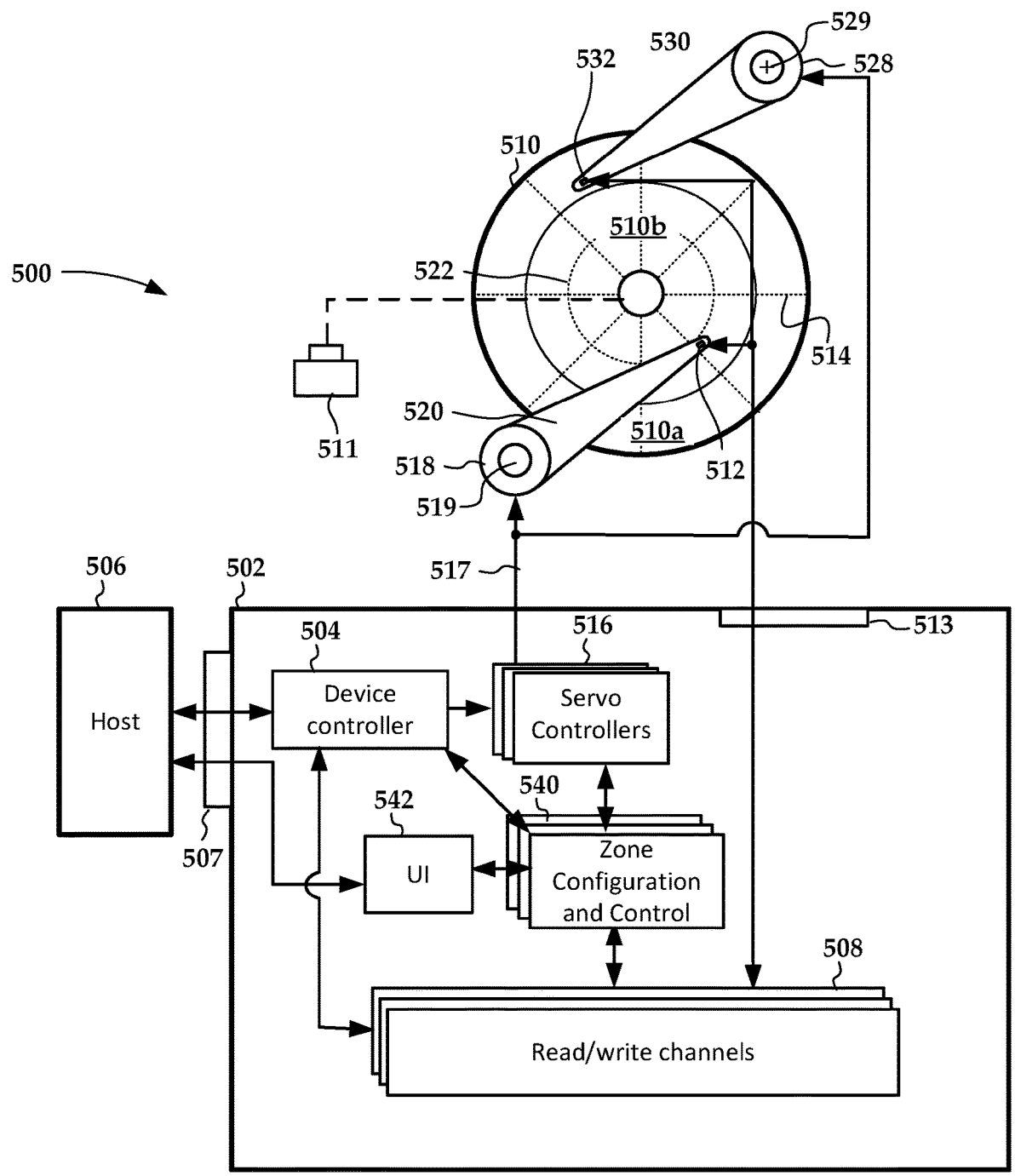
FIG. 5 is a block diagram of a disk drive apparatus according to an example embodiment.

In FIG. 5, a block diagram illustrates a data storage drive 500 that utilizes one or more actuators according to example embodiments. The apparatus includes circuitry 502 such as one or more device controllers 504 that process read and write commands and associated data from a host device 506 via a host interface 507. The host interface 507 includes circuitry that enables electronic communications via standard bus protocols (e.g., SATA, SAS, PCI, etc.). The host device 506 may include any electronic device that can be communicatively coupled to store and retrieve data from a data storage device, e.g., a computer, a server, a storage controller. The device controller 504 is coupled to one or more read/write channels 508 that read from and write to surfaces of one or more magnetic disks 510 that are driven by a motor 511.

The read/write channels 508 generally convert data between the digital signals processed by the device controller 504 and the analog signals conducted through two or more heads 512, 532 during read operations. The two or more heads 512, 532 each may include respective read transducers capable of concurrently reading the disk 510, e.g., at least two heads reading from the same surface. The read transducers may be configured to read in any mode, such as conventional single-track with single reader, or various TDMR modes such as MSMR and TDMR-MT. The two or more heads 512, 532 may also include respective write transducers that concurrently write to the disk 510. The write transducers may be conventional magnetic recording (CMR), heat-assisted magnetic recording (HAMR), microwave assisted magnetic recording (MAMR), and may write in various track configurations, such as conventional, SMR, and IMR. On at least one surface, heads 512, 532 are configured for writing different zones such that the heads traverse a skew angle range that is reduced from a total skew range of the disk 510.

The read/write channels 508 may include analog and digital circuitry such as digital-to-analog converters, analog-to-digital converters, detectors, timing-recovery units, error correction units, etc. The read/write channels 508 are coupled to the heads 512, 532 via interface circuitry 513 that may include preamplifiers, filters, etc. As shown in the figure, the read/write channels 508 may be capable of concurrently processing one of a plurality of data streams from the multiple heads 512, 532.

In addition to processing user data, the read/write channels 508 read servo data from servo marks 514 on the magnetic disk 510 via the read/write heads 512, 532. The servo data are sent to one or more servo controllers 516 that use the data to provide position control signals 517 to one or more actuators, as represented by voice coil motors (VCMs) 518. The VCM 518 rotates an arm 520 upon which the read/write heads 512 are mounted in response to the control signals 517. The position control signals 517 may also be sent to microactuators (not shown) that individually control each of the heads 512, e.g., causing small displacements at each read/write head.

The VCM 518 may be a stacked or split actuator, in which case two VCM parts are configured to independently rotate different arms about a common axis 519. In such a case, other heads (not shown) will access data on the disks simultaneously with that of heads 512, and these other heads may be coupled to circuitry 502 similar to illustrated head 532. A second actuator, e.g., VCM 528, may independently and simultaneously rotate a second arm 530 about a second axis 529. Corresponding heads 532 may be rotated by the VCM 528 and may operate simultaneously with the heads 512 under commands from the one or more servo controllers 516. A microactuator (not shown) may also be used on arm 530 to cause fine displacements of head 532.

A zone configuration and control module 540 manages the assignment of heads 512, 532 to particular zones 510*a-b* of the disk 510. Each of the zones 510*a-b* has a skew angle range that is less than a full skew angle range of the full disk 510. The zone configuration and control module 540 may determine the parameters of the zones 510*a-b* during an initial configuration of the drive 500, e.g., partitioning, formatting. A user interface module 542 may be used to read these configurations from the end-user, e.g., via the host interface using legacy commands, or via a dedicated interface (e.g., serial line input).

Among the track parameters used by the zone configuration and control module 540 are zone geometry information, track read/write type, and how the zones 510*a-b* are mapped. As an example of the mapping of zones 510*a-b*, the zones 510*a-b* may be part of the same logical block address space, and may be all part of one partition or separated into different drive partitions. In some embodiments, the zones 510*a-b* may be presented to the host 506 as different logical units (e.g., LUNs).

Figure 6:
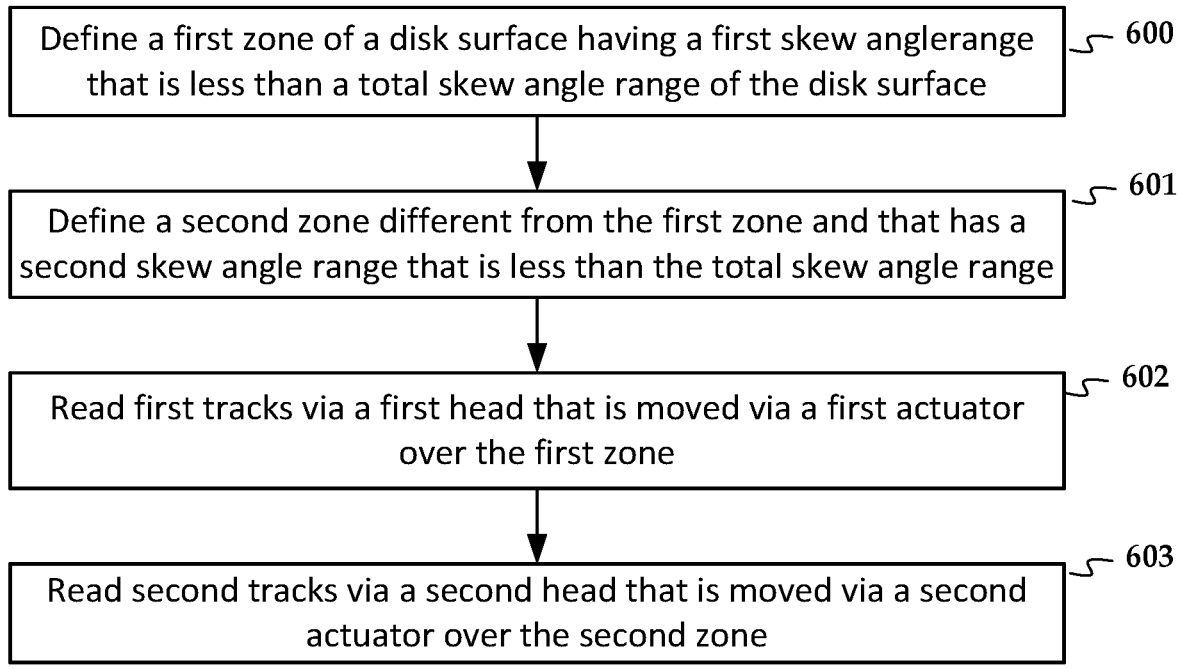
FIGS. 6 and 7 are flowcharts of methods according to example embodiments.

In FIG. 6, a flowchart shows a method according to an example embodiment. The method involves defining 600 a first, radially-defined, zone of a disk surface that has a skew angle range less than a total skew range of the disk surface. A second, radially defined, zone of the disk surface different from the first zone and having a skew angle range less than the total skew angle range is also defined 601. First tracks are read 602 via a first head that is moved via a first actuator over the first zone. Second tracks are read 603 via a second head that is moved via a second actuator over the second zone. The first and second heads are optimized for first and second skew ranges associated with the first and second zones.

Figure 7:
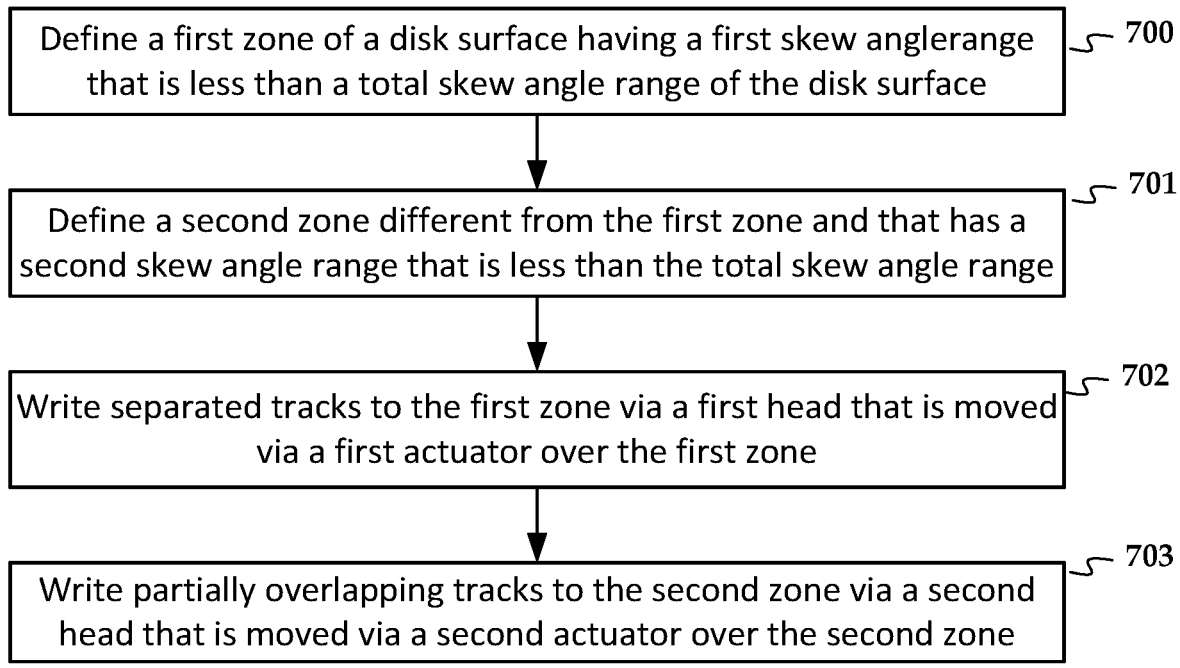

In FIG. 7, a flowchart shows a method according to an example embodiment. The method involves defining 700 a first, radially-defined, zone of a disk surface that has a skew angle range less than a total skew angle range of the disk surface. A second, radially defined, zone of the disk surface different from the first zone and having a skew angle range less than the total skew angle range is also defined 701. Separated tracks (e.g., conventional tracks) are written 702 to a first zone via a first head that is moved via a first actuator over the first zone. Partially overlapping tracks (e.g., shingled, interlaced) are written 703 to a second zone via a second head that is moved via a second actuator over the second zone.

The various embodiments described above may be implemented using circuitry, firmware, and/or software modules that interact to provide particular results. One of skill in the relevant arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
reading first tracks via a first head that is moved via a first voice coil motor over a first, radially-defined, zone of a disk surface, the first voice coil motor and first head rotating about a first pivot;
reading second tracks via a second head that is moved via a second voice coil motor over a second zone of the disk surface that is separate from the first zone, the second voice coil motor and second head rotating about a second pivot independently from the first voice coil motor and first head, the second pivot being different from the first pivot, the first and second heads being optimized to read data within first and second skew angle ranges associated with the first and second zones, the first and second skew angle ranges each being less than a total skew angle range of the disk surface; and
reading from both the entire first and second zones via at least one of the first and second heads.

2. The method of claim 1, wherein at least the first tracks are read as two-dimensional magnetic recording (TDMR) tracks, and wherein the first and second skew angle ranges facilitate closer read transducer spacing for the first and second head relative to a TDMR-reading head that reads over the total skew angle range.

3. The method of claim 2, wherein the TDMR tracks comprise one of multi-signal magnetic recording (MSMR) tracks and TDMR multiple-track recording (TDMR-MT) tracks.

4. The method of claim 1, further comprising:
receiving an end-user-supplied definition of the first and second zones during an initial configuration of a drive, the end-user-supplied definition defining, for each of the first and second zones, at least one of:
a zone geometry;
a track type for the zone that includes at least separated and partially overlapping tracks; and
a mapping of a logical block address space for the zone; and
establishing the first and second zones in response to the end-user-supplied definition.

5. The method of claim 1, further comprising:
writing separated tracks via the first head to the first zone; and
writing overlapping tracks via the second head to the second zone.

6. The method of claim 1, wherein the first and second zones span first and second radial distances d1 and d2, wherein d1≠d2.

7. The method of claim 1, wherein the first and second pivots are aligned with a center location of the disk surface such that first and second arms that move the first and second heads are at a right angle relative to the center location, and wherein the first and second heads are rotated at first and second angles relative to the first and second arms to minimize skew of the first and second heads within the respective first and second zones.

8. The method of claim 1, wherein the first and second pivots are aligned with first and second center locations within the respective first and second zones such that first and second arms that move the first and second heads are at a right angle relative to the center locations.

9. The method of claim 1, wherein one of the first and second zones is optimized for performance and another of the first and second zones is optimized for capacity.

10. The method of claim 1, further comprising:
receiving an end-user-supplied definition of the first and second zones during an initial configuration of a drive, the user-supplied definition defining, for each of the first and second zones, at least one of:
a read mode that includes at least separated tracks and two-dimensional magnetic recording tracks; and
track parameters that include at least track pitch and bit aspect ratio; and
writing to the first and second zones with the respective separated tracks and overlapping tracks based on the end-user-supplied definition.

11. A method comprising:
writing separated tracks to a first, radially-defined, zone of a disk surface of a drive via a first head that is moved via a first voice coil motor over the first zone, the first voice coil motor and first head rotating about a first pivot;
writing partially overlapping tracks to a second, radially-defined, zone of the disk surface that is separate from the first zone via a second head that is moved via a second voice coil motor over the second zone, the second voice coil motor and second head rotating about a second pivot independently from the first voice coil motor and first head, the second pivot being different from the first pivot; and
reading the partially overlapping tracks within the second zone via first and second read transducers of the second head, a skew range of the second zone facilitating closer spacing between the first and second read transducer relative to a multiple-reader head that reads over a total skew angle range of the disk surface; and
reading from both the entire first and second zones via at least one of the first and second read transducers.

12. The method of claim 11, further comprising:
receiving an end-user-supplied definition of the first and second zones during an initial configuration of the chive, the end-user-supplied definition defining, for each of the first and second zones, at least one of:
a zone geometry;
a track type for the zone that includes at least separated and partially overlapping tracks; and
a mapping of a logical block address space for the zone; and
writing to the first and second zones with the respective separated tracks and overlapping tracks based on the end-user-supplied definition.

13. The method of claim 11, wherein the second head has a larger write width than the first head.

14. The method of claim 11, wherein the first and second zones encompass respective first and second skew angle ranges that are each less than a total skew angle range of the disk surface, and wherein the first and second heads are respectively optimized for the first and second skew ranges.

15. The method of claim 11, wherein at least one of the separated tracks and the overlapping tracks are read as two-dimensional magnetic recording (TDMR) tracks.

16. The method of claim 11, wherein the overlapping tracks comprise one of shingled magnetic recording tracks and interlaced magnetic recording tracks.

17. An apparatus, comprising:
interface circuitry operable to communicate with first and second heads and with first and second voice coil motors that respectively move the first and second heads independently over a disk surface, the first and second voice coil motors rotating about respective different first and second pivots; and
a controller coupled to the interface circuitry and configured to:
read first tracks via the first head from a first, radially-defined, zone of the disk surface;
read second tracks via the second head from a second zone of the disk surface that is separate from the first zone, the first and second heads being optimized for first and second skew angle ranges associated with the first and second zones, the first and second skew angle ranges each being less than a total skew angle range of the disk surface; and
read from both the entire first and second zones via at least one of the first and second heads.

18. The apparatus of claim 17, wherein the controller is further configured to:
write separated tracks via the first head to the first zone; and
write overlapping tracks via the second head to the second zone.

19. The apparatus of claim 18, wherein the overlapping tracks comprise at least one of shingled magnetic recording tracks and interlaced magnetic recording tracks.

20. The apparatus of claim 17, wherein the first and second tracks are read as two-dimensional magnetic recording (TDMR) tracks.

* * * * *